Dec. 27, 1949     T. B. UPCHURCH, JR     2,492,450
INFLIGHT TIRE GAUGE
Filed Nov. 9, 1945     2 Sheets-Sheet 1
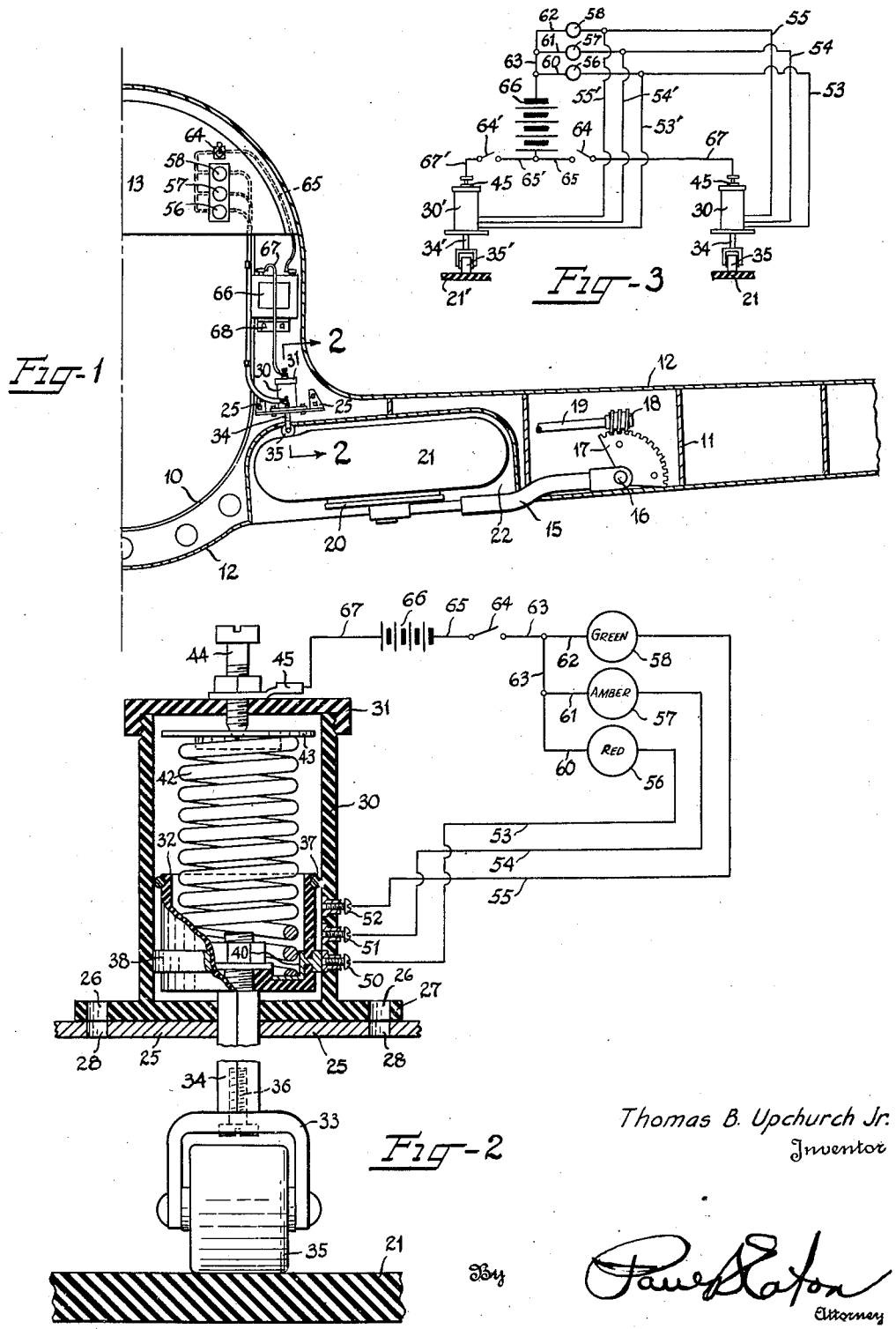
Thomas B. Upchurch Jr.
Inventor Dec. 27, 1949 T. B. UPCHURCH, JR 2,492,450
INFLIGHT TIRE GAUGE
Filed Nov. 9, 1945 2 Sheets-Sheet 2
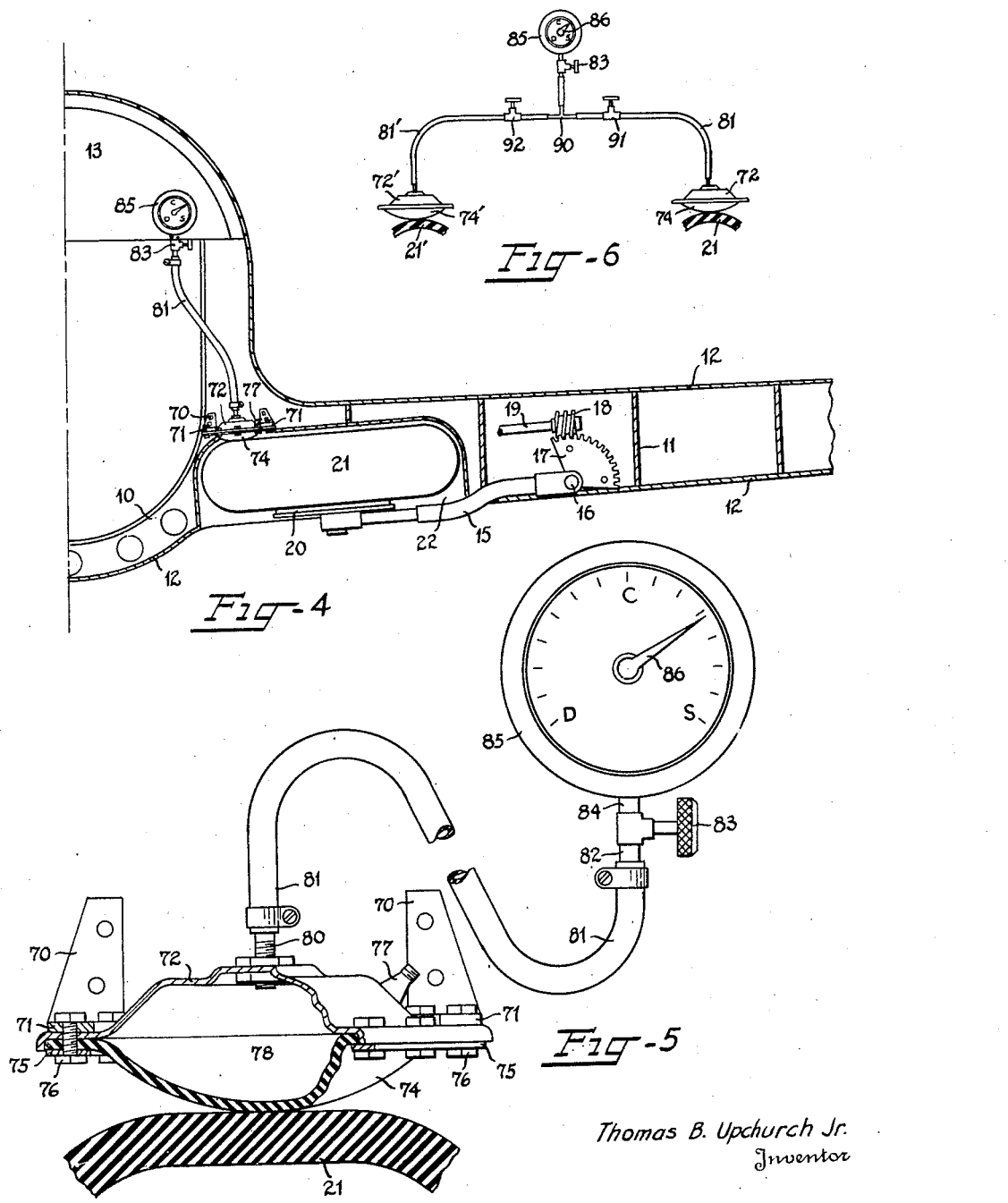
Thomas B. Upchurch Jr.
Inventor Patented Dec. 27, 1949

2,492,450

UNITED STATES PATENT OFFICE 2,492,450

INFLIGHT TIRE GAUGE

Thomas B. Upchurch, Jr., Raeford, N. C.

Application November 9, 1945, Serial No. 627,563

2 Claims. (Cl. 73—390)

This invention relates to a gauging and indicating device for aircraft, such as airplanes, dirigible balloons, and any type of air craft having landing wheels which are retractable during flight.

It is a well-known fact that while in flight sometimes there occurs a leakage in the pneumatic tires of aircraft so that when the pilot lands he is not aware of the fact that one of his tires is not properly inflated, sometimes not being inflated at all, resulting in a serious accident and much damage to the craft and, sometimes, the loss of life of the occupants of the craft. By having an indicating device which will contact the pneumatic casing of an aircraft when the retractable wheels are in retracted position, it is possible to indicate to the pilot as to whether or not the tires of the aircraft are properly inflated.

It is an object of this invention to provide means for engaging the exterior of a pneumatic casing of an aircraft when the wheels are moved to retracted position which will indicate to the pilot of the aircraft as to whether or not the wheels are properly inflated and, if not properly inflated, what degree of inflation is present; so that the pilot will be forewarned in making a landing as to what he faces and can take precautions by landing on one wheel and the like and thus avoid a serious wreck.

It is another object of this invention to provide means for engaging the pneumatic casing of an aircraft when the wheels are in retracted position and indicating the amount of pressure in the casing through suitable indicating means disposed within the pilot's cockpit.

Some of the objects of the invention having been stated, other objects will appear as the description proceeds when taken in connection with the accompanying drawings, in which:

Figure 1 is a transverse sectional view through a portion of an airplane, showing my invention installed;

Figure 2 is a vertical sectional view taken substantially along the line 2—2 in Figure 1, and showing the indicating means and wiring diagram schematically;

Figure 3 is a schematic wiring diagram showing the two landing wheels of an airplane hooked to one common indicator;

Figure 4 is a view similar to Figure 1, but showing another form of my invention in installed position;

Figure 5 is an enlarged detail view, partly in section and showing the pneumatically-operated indicating device associated with a retracted wheel of an aircraft;

Figure 6 is a schematic diagram showing how both wheels of an airplane may be connected to a common gauge of the type shown in Figures 4 and 5.

Referring more specifically to the drawings, the numeral 10 indicates a portion of the framework of the fuselage of an airplane, and 11 indicates a portion of the wing of an airplane, both in section, and the fuselage and the wing having a suitable covering 12 which is usually of fabric or metal. The airplane has an instrument board 13 for various flight instruments, these instruments being omitted in the drawings. The airplane is usually equipped with two or three retractable wheels, only one of the wheels being shown in the drawings, that being the retractable wheel on the right side of the airplane, it being understood that there is another similar wheel located in the other wing of the airplane; and, it would also have either a nose wheel or a tail wheel, depending upon the style of the plane. These nose and tail wheels in high speed airplanes are usually retractable also, and this invention is adapted to be applied to all three of the wheels if desired and, certainly, to the two main landing wheels.

Various types of retractable landing gear are employed, and in the present instance I show a strut 15 pivotally mounted as at 16 and having a segmental gear 17 secured to the shaft 16; the strut 15, shaft 16, and segmental gear 17 being fixed to each other so that when a worm 18 on a worm shaft 19 is rotated by manipulation by the pilot by any conventional means, not shown, the wheels 20, rotatably mounted on the lower end of the strut 15, together with a pneumatic casing 21 thereon can be raised into retracted position into a suitable pocket 22 where the pneumatic casing 21 will be removed from the slipstream of the airplane.

In Figure 1, I show a bracket 25 secured to the framework 10 of the airplane, and this bracket 25 is secured thereto by suitable bolts penetrating holes 26 in a base member 27 and also penetrating holes 28 in the bracket 25. This base member 27 has integral therewith an uprising well 30 which has a suitable cap 31 threadably secured on its upper end. Slidably mounted in the well 30 is a cylindrical member 32 in which is mounted a forked bracket 34 having a wheel 35 rotatably mounted in its lower end. The cylindrical portion 32 has a guide or piston or packing ring 37 and also has a metallic band 38 surrounding the same, this metallic band penetrating the cylindrical member 32 at one point and having a metallic portion 40 on which the lower end of a compression spring 42 rests. This compression spring is of steel and a metallic disk 43 fits on the top of the compression spring 42. A screw 44 is threadably mounted in the cap 31 and has mounted therearound a terminal 45.

Mounted in the side wall of shell or cylindrical member 30 are three contact members 50, 51, and 52. The contacts 50, 51, and 52 have leading therefrom wires 53, 54, and 55. These wires lead to one of the terminals of the incandescent bulbs 56, 57 and 58. The bulb 56 is red and the bulb 57 is amber and the bulb 58 is green, which when illuminated will indicate danger, caution, or safety.

To the other sides of incandescent bulbs 56, 57, and 58 wires 60, 61, and 62 lead to a common wire 63 which wire is connected to one side of a switch 64, this being any type of switch, such as a toggle switch. From the other side of switch 64, a wire 65 leads to a source of electrical energy such as a battery 66, supported on a suitable bracket 68; and from the other side of battery 66, the wire leads to the terminal 45.

In the other form of my invention shown in Figures 4, 5, and 6, the same result is accomplished by a pneumatic gauge instead of an electrical indicating apparatus. In this form of the invention, like reference characters as to the conventional parts of the airplane will apply.

To the framework of the airplane there is secured a bracket 70 having a semi-annular portion 71 to the lower surface of which is secured an inverted cup-shaped member 72 which preferably is of metallic or plastic material, and fitting against the outer portions of member 72 is a flexible diaphragm 74 preferably of rubber, and a ring or annular portion 75 fits against the outer edge portions of diaphragm 74 and suitable bolts 76 secure the annular member 75, the diaphragm 74, the upper portion 72 to the semi-annular portion 71 of bracket 70. This portion 72 may be provided with a suitable valve 77 such as is employed in the inner tubes which fit into pneumatic casings so that if any additional air pressure is required within chamber 78, formed by diaphragm 74 and member 72, such pressure can be applied by a suitable pump or from a source of compressed air.

Secured to the upper central portion of member 72 is a nipple 80 which is hollow and has its lower end in communication with the chamber 78. To the upper end of nipple 80 is secured a flexible tubing 81 which leads to any suitable portion of the airplane such as the instrument board 13 where it is connected to a nipple 82 which nipple has a suitable shut-off valve 83 thereon and another nipple 84 leads into a conventional pressure gauge 85. This pressure gauge is adapted to register the air pressure with the wheels in retracted position in chamber 78. Normally pressure within chamber 78 would cause gauge hand 86 to rest at the point S on the gauge, indicating safety; and, if there was not sufficient pressure within the chamber 78 due to its contact with pneumatic casing 21, then the gauge might rest intermediate between the danger point D and the safety point S at portion C for example, indicating caution. It is evident that there would have to be sufficient pressure in chamber 78 to resist upward movement of diaphragm 74 as the result of firm contact between the diaphragm 74 and the pneumatic casing 21; however, if pneumatic casing 21 did not have the required amount of pressure therein, then the hand 86 would not be disposed at point S on the gauge but would be disposed at a lower point on the gauge, possibly down to the point D indicating danger, if there was not sufficient pressure within the pneumatic casing to compress the diaphragm 74 upwardly.

In the form of the invention shown in Figures 1, 2, and 3 if the pneumatic casing 21 had normal air pressure therein, then it would tend to move the cylindrical member 32 upwardly to a point where the contact ring 38 would contact the contact member 52 and a circuit would be passed through the incandescent bulb 58 which is green and which would indicate to the pilot that the casing was properly inflated. If there were some pressure in pneumatic casing 21 but not the required pressure, then the contact ring 38 would probably rest on contact 51 and this would energize bulb 57 indicating caution. If there were practically no pressure within casing 21, then the parts would rest in the position shown in Figure 2 and contact ring 38 would engage contact 50 and incandescent bulb 56, which is red, would be illuminated which would indicate to the pilot that this casing was completely deflated and, therefore, could not stand the impact of a landing.

It is not necessary for the indicators in both forms of the invention to operate at all times. During flight the switch 64 can be moved to disconnected position to save battery current and, likewise, the valve 83 could be closed to cut off the pressure from the gauge 85 if it were not desired for the gauge to be registering at all times.

In both forms of the invention, there could be a separate indicating device for each wheel of the airplane if desired, but if it were desired to connect both wheels to a common indicating apparatus, then there is shown in Figure 3 how the first form of the invention shown in Figures 1 and 2 could have both wheels connected to a common indicating device in which like reference characters apply to the left hand wheel as has been described for the right hand wheel except that the prime notation has been added and the description previously given will equally apply. It might be stated that in Figure 3, if both switches 64 and 64' were left in on position, if one wheel 21 should have low pressure therein, then that wheel would probably illuminate either the danger or caution bulb, whereas, the other wheel having sufficient pressure therein would illuminate the green or safe bulb. The pilot at once would know that something was wrong and, by moving one of the switches 64 and 64' to open position it would immediately indicate which of the tires is deflated when either one of the switches 64 and 64' moved to open position.

In the schematic showing in Figure 6 also like reference characters will apply to the left hand wheel except that flexible pipe 81 and 81' would lead to a T 90 and each of the pipes 81 and 81' would have a valve 91 or 92 therein and, as long as both casings 21 were fully inflated, then the pointer 86 would stand on the S position; but, if one of the casings was not fully inflated, then the pointer would stand, say, at the point shown in Figure 5. The pilot at once would know that something was wrong and, by closing valve 91, if the pointer 85 dropped back towards the danger point, he would know that it was the left hand wheel of the airplane which was not fully inflated; and, whereas, if the pointer 86 moved farther clockwise, he would know that it was the right hand wheel which was not fully inflated and, by manipulating the valves 91 and 92 he could very quickly determine which of the casings was not fully inflated and the degree of inflation therein.

It will be noted in Figure 2 that the lower end of the shank 34 has the inverted U-shaped member 33 rotatably secured thereto by means of a screw 36. This will allow the roller 35 to swivel in case the tire is rotating when it is moved to fully retracted position. It will also be noted that in Figure 1 the casing is shown as being deflated so that a depression will be formed in it by the roller 35, thus allowing the contact 40 to make contact with contact 50 to show a red light.

In the drawings and specification there has been set forth a preferred embodiment of the invention, and although specific terms are employed, they are used in a generic and descriptive sense only, and not for purpose of limitation, the scope of the invention being defined in the claims.

I claim:

1. Apparatus for gauging and indicating the pressure in a pneumatic tire mounted on the retractable landing gears of an airplane comprising a shell connected to said airplane, a cylindrical member disposed within said shell and having a tire engaging member connected to the lower end thereof, said tire engaging member comprising a shank having a forked bracket pivotally connected thereto and said bracket having a roller rotatably mounted in its lower end, a compression spring of predetermined resistance disposed within the shell and adapted to urge the cylindrical member downwardly, a plurality of indicating incandescent bulbs each having an electric circuit leading therethrough, a plurality of contact points on said shell member disposed within the respective circuits leading through the incandescent bulbs, a contact member on the cylindrical member disposed so as to engage the respective contact members on the shell and to establish a circuit through one of the bulbs as the cylindrical member is moved by the tire engaging member, said landing gears having means for moving the same to retracted position and applying a force thereto which is greater than the resistance offered by said compression spring, whereby upon the tire engaging the wheel of the tire engaging member a variation in the air pressure of said tire will cause the tire engaging member to be moved upwardly an amount dependent on the air pressure in the tire thus moving the cylinder and its contact member within the shell and establishing a circuit to one of the bulbs to indicate to an operator the amount of pressure in said tire.

2. Apparatus for gauging and indicating one at a time, the amount of air pressure in the various tires mounted on a plurality of retractible landing gears in an airplane comprising movable means associated with each tire and engageable by the tire when it is moved to fully retracted position, an indicator having connection with the plurality of movable means, and means for establishing connection between the indicator and an individual movable means for a particular tire, said movable means comprising a shell connected to said airplane, a cylinder member disposed within said shell, a compression spring of predetermined resistance disposed within the shell and adapted to urge the cylinder member downwardly, a tire engaging member disposed on the lower end of the cylinder member, said tire engaging member comprising a shank having a forked bracket pivotally connected thereto and said bracket having a roller rotatably mounted in its lower end, said landing gears having means for moving the same to retracted position and applying a force thereto which is greater than the resistance offered by said compression spring, whereby upon one of the tires engaging the roller of a tire engaging member, a variation in the air pressure of said tire will cause the tire engaging member to be moved upwardly an amount dependent on the air pressure in the tire thus actuating the means for establishing connection between the indicator and an individual movable means for a particular tire, whereby the indicator will indicate the amount of air pressure in the selected tire.

THOMAS B. UPCHURCH, Jr.

REFERENCES CITED

The following references are of record in the file of this patent:

UNITED STATES PATENTS

| Number | Name | Date |
| --- | --- | --- |
| 1,087,979 | Putman | Feb. 24, 1914 |
| 1,156,862 | Sibley | Oct. 12, 1915 |
| 1,354,069 | Terharr | Sept. 28, 1920 |
| 1,581,320 | Pumphrey, Jr. | Apr. 20, 1926 |
| 1,796,244 | Courchesne | Mar. 10, 1931 |
| 1,849,730 | Morse | Mar. 15, 1932 |
| 1,851,978 | Dinger | Apr. 5, 1932 |
| 2,358,370 | Williams | Sept. 19, 1944 |

FOREIGN PATENTS

| Number | Country | Date |
| --- | --- | --- |
| 116,915 | Australia | Apr. 28, 1943 |
| 645,607 | France | June 27, 1928 |